(12) United States Patent
Futakuchi et al.

(10) Patent No.: US 7,526,915 B2
(45) Date of Patent: May 5, 2009

(54) SINGLE CYLINDER ENGINE WITH TERNARY CATALYST IN EXHAUST PASSAGE AND VEHICLE PROVIDED WITH SAME

(75) Inventors: Yorio Futakuchi, Shizuoka (JP); Akihiko Ookubo, Shizuoka (JP); Hideaki Kawabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 251 days.

(21) Appl. No.: 11/197,917

(22) Filed: Aug. 5, 2005

(65) Prior Publication Data

US 2007/0028598 A1 Feb. 8, 2007

(51) Int. Cl.
*F01N 3/00* (2006.01)

(52) U.S. Cl. .......................................... 60/285; 60/299

(58) Field of Classification Search .................... 60/275, 60/278, 289, 290, 298, 299, 300, 301, 302, 60/285
See application file for complete search history.

(56) References Cited

U.S. PATENT DOCUMENTS

| | | | | |
|---|---|---|---|---|
| 5,941,211 | A * | 8/1999 | Brehob et al. ................ | 123/325 |
| 6,240,721 | B1 * | 6/2001 | Ito et al. ....................... | 60/274 |
| 6,560,960 | B2 * | 5/2003 | Nishimura et al. ............ | 60/284 |
| 6,588,205 | B1 * | 7/2003 | Kumagai et al. .............. | 60/298 |
| 6,978,603 | B2 * | 12/2005 | Asanuma ....................... | 60/297 |
| 7,059,120 | B2 * | 6/2006 | Nakagawa et al. ............ | 60/289 |
| 2002/0038543 | A1 * | 4/2002 | Nishimura et al. ............ | 60/284 |
| 2003/0061803 | A1 * | 4/2003 | Iihoshi et al. ................. | 60/285 |
| 2003/0131593 | A1 * | 7/2003 | Asanuma ....................... | 60/297 |
| 2004/0237514 | A1 * | 12/2004 | Surnilla et al. ................ | 60/299 |

FOREIGN PATENT DOCUMENTS

JP 2004-150310 5/2004

* cited by examiner

*Primary Examiner*—Thomas E Denion
*Assistant Examiner*—Diem Tran
(74) *Attorney, Agent, or Firm*—Keating & Bennett, LLP

(57) ABSTRACT

A single cylinder engine includes an engine body having a combustion chamber, an intake opening and an exhaust opening which face toward the combustion chamber, an intake passage in communication with the combustion chamber through the intake opening, and an exhaust passage in communication with the combustion chamber through the exhaust opening, an intake valve that opens and closes the intake opening, an exhaust valve that opens and closes the exhaust opening, an injector that injects a fuel toward the intake opening and into the intake passage, a ternary catalyst provided in the exhaust passage, and an engine control unit (ECU) that performs a decelerated operation to selectively execute a cycle for injection of a fuel from the injector, a quantity of which makes an air-fuel ratio in the combustion chamber substantially equal to a theoretical air fuel ratio, and a cycle for inhibition of fuel injection from the injector.

6 Claims, 12 Drawing Sheets

SINGLE CYLINDER ENGINE WITH TERNARY CATALYST IN EXHAUST PASSAGE AND VEHICLE PROVIDED WITH SAME

BACKGROUND OF THE INVENTION

1. Field of the Invention

The present invention relates to a single cylinder engine with a ternary catalyst in an exhaust passage, and a vehicle provided with the same.

2. Description of the Related Art

Conventionally, a catalyst capable of purifying CO, HC and NOx at the same time, that is, a ternary catalyst, is used to purify exhaust gases from an engine (for example, see JP-A-2004-150310, paragraph 0040). In order to have an effective ternary catalyst, it is necessary to perform combustion in an engine at a theoretical air fuel ratio.

In recent years, a further improvement in economy in fuel consumption for engines has been desired. As one of the measures for improving fuel economy, it is conceivable to reduce fuel consumption at the time of decelerated operation by making an air-fuel ratio larger at the time of decelerated operation than at the time of steady speed. For example, in engines in which combustion at a theoretical air fuel ratio is performed at the time of steady speed, it is conceivable to make an air-fuel ratio larger at the time of decelerated operation than a theoretical air fuel ratio. However, when an air-fuel ratio deviates from a theoretical air fuel ratio it is not possible to have an effective ternary catalyst, so that favorable purification of exhaust gases becomes difficult. Therefore, it is difficult to make a further improvement fuel consumption economy compatible with purification of exhaust gases by a ternary catalyst.

SUMMARY OF THE INVENTION

In order to overcome the problems described above, preferred embodiments of the present invention provide a further improvement in fuel consumption economy that is compatible with purification of exhaust gases by a ternary catalyst.

A single cylinder engine according to a preferred embodiment of the present invention includes an engine body, a combustion chamber, an intake opening and an exhaust opening which face toward the combustion chamber, an intake passage in communication with the combustion chamber through the intake opening, an exhaust passage in communication with the combustion chamber through the exhaust opening, an intake valve that opens and closes the intake opening, an exhaust valve that opens and closes the exhaust opening, an injector that injects a fuel toward the intake opening and into the intake passage, a ternary catalyst provided in the exhaust passage, and a control device that decelerates operation to selectively execute a cycle for injection of a fuel, a quantity of which makes an air-fuel ratio in the combustion chamber substantially equal to a theoretical air fuel ratio, and a cycle for inhibition of fuel injection from the injector.

The engine includes a cycle for inhibition of fuel injection at the time of decelerated operation, so that fuel consumption is reduced. Therefore, fuel consumption economy is improved.

A fuel injection in one cycle is not simply reduced, but a cycle in which a fuel is injected and a cycle in which a fuel is not injected is selectively executed so that a fuel injection quantity is reduced as a whole. In a cycle in which a fuel is injected, an air-fuel ratio becomes substantially equal to a theoretical air fuel ratio. Therefore, in a cycle in which a fuel is injected, it is possible to have a ternary catalyst acting effectively. On the other hand, in a cycle in which a fuel is not injected exhaust gases are not substantially generated so that purification with a ternary catalyst is dispensed with. Accordingly, clean exhaust gases can be continually discharged from an exhaust passage.

Further, since an injector preferably injects a fuel toward an intake opening, fuel is inhibited from adhering to a wall surface of an intake passage. Therefore, adhered fuel is inhibited from flowing into a combustion chamber along the wall surface and only a fuel injected from an injector substantially flows into the combustion chamber. Accordingly, it becomes easy to correctly control a quantity of a fuel supplied into the combustion chamber and to have an air-fuel ratio approaching a theoretical air fuel ratio in a cycle in which a fuel is injected, and also to prevent generation of exhaust gases in a cycle in which a fuel is not injected.

With the preferred embodiments of the engine, a synergistic effect obtained by a combination of the effects described above makes a further improvement in fuel consumption economy compatible with purification of exhaust gases by a ternary catalyst.

Other features, elements, characteristics and advantages of the present invention will be apparent from the following detailed description of preferred embodiments with reference to the attached drawings.

DETAILED DESCRIPTION OF PREFERRED EMBODIMENTS

Figure 1:
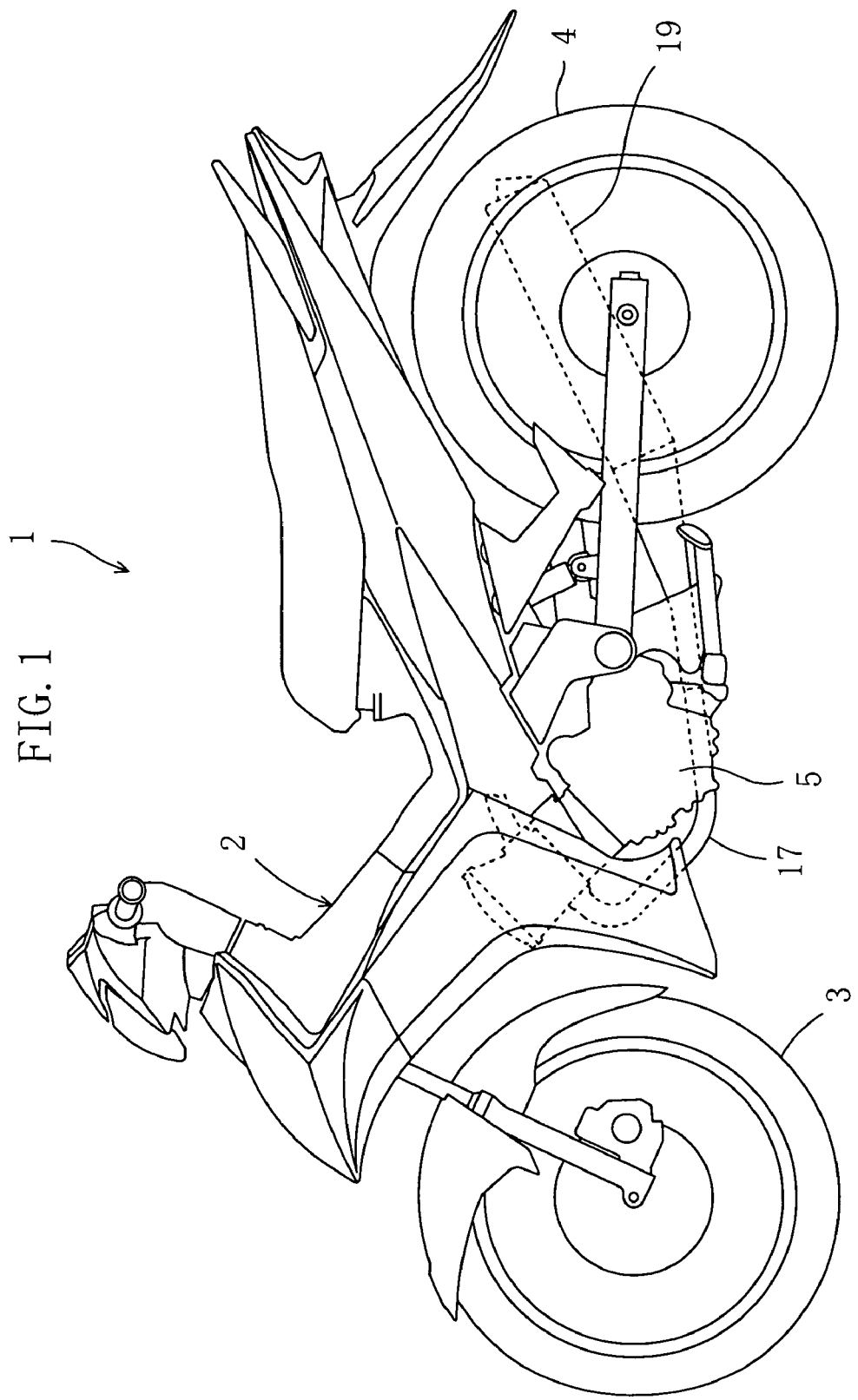
FIG. 1 is a side view showing a motorcycle according to a preferred embodiment of the present invention.

As shown in FIG. 1, a vehicle according to the present preferred embodiment is preferably a motorcycle 1. However, vehicles according to the preferred embodiments of the invention are not limited to the motorcycle 1. The vehicle according to the preferred embodiments of the present invention may be other saddle-ride type vehicles or other vehicles that are not saddle-ride type vehicles. In addition, "motorcycle" includes a scooter, etc. in addition to a so-called motorbike.

The motorcycle 1 includes a vehicle body 2, a front wheel 3 and a rear wheel 4 mounted to the vehicle body 2, and an engine 5 that drives the rear wheel 4 through a drive chain (not shown), or the like. In the present preferred embodiment, the engine 5 preferably includes a single-cylinder 4-cycle internal combustion engine, for example.

Figure 2:
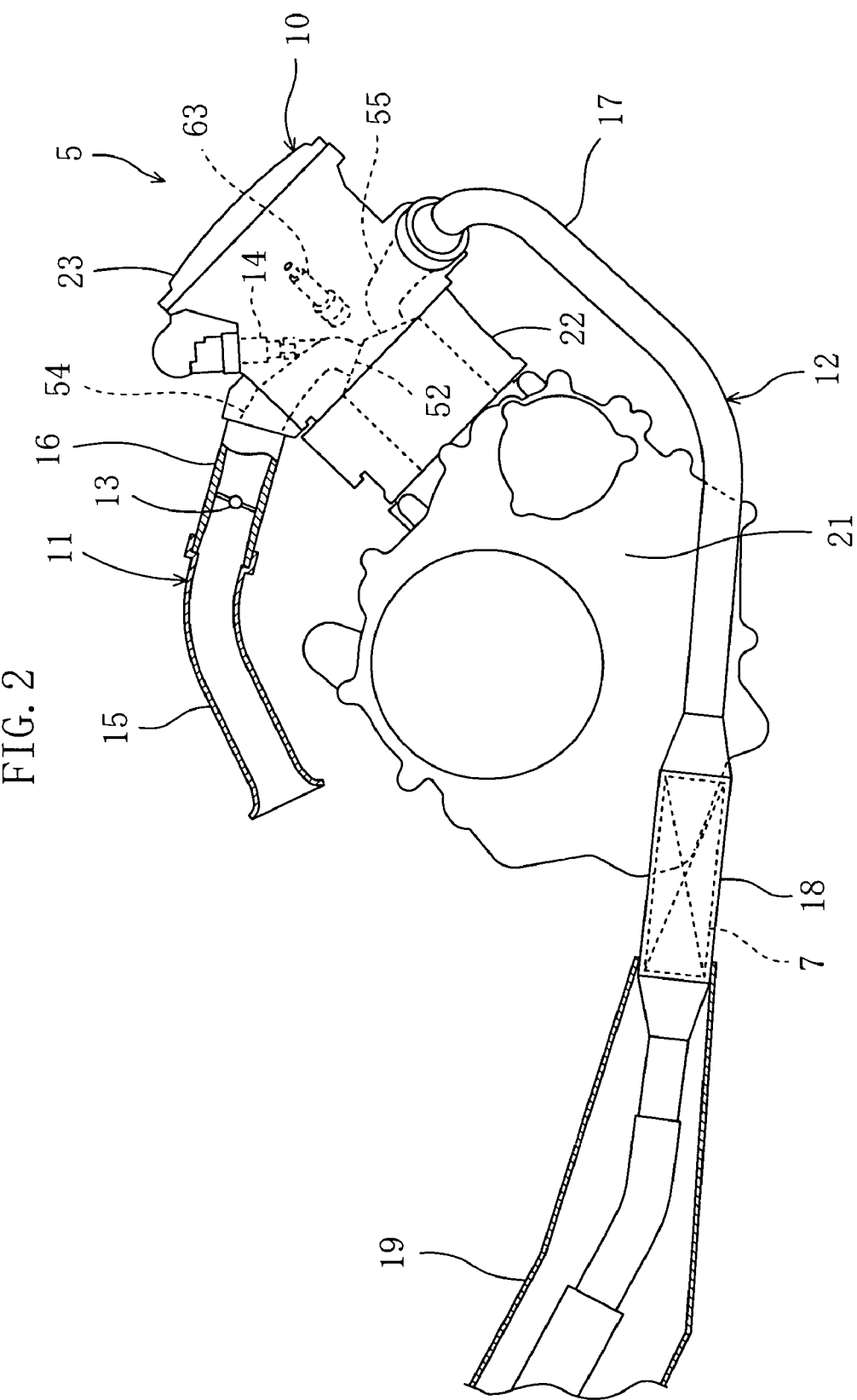
FIG. 2 is a view showing the construction of an engine according to a preferred embodiment of the present invention.

As shown in FIG. 2, the engine 5 includes an engine body 10, an intake passage 11, and an exhaust passage 12. The engine body 10 includes a crankcase 21 in which a crankshaft 42 (see FIG. 3) is accommodated, a cylinder 22 unified with the crankcase 21, and a cylinder head 23 mounted to the cylinder 22. According to the present preferred embodiment, the crankcase 21 and the cylinder 22 are unified with each other to form a cylinder block. However, the crankcase 21 and the cylinder 22 may be formed separately and assembled to each other.

The intake passage 11 includes an intake pipe 15 connected to an air cleaner (not shown), a throttle body 16, and an intake port 54 formed in the cylinder head 23. A downstream end of the intake pipe 15 is connected to an upstream end of the throttle body 16 and a downstream end of the throttle body 16 is connected to the cylinder head 23. A throttle valve 13 is provided in the throttle body 16.

Figure 3:
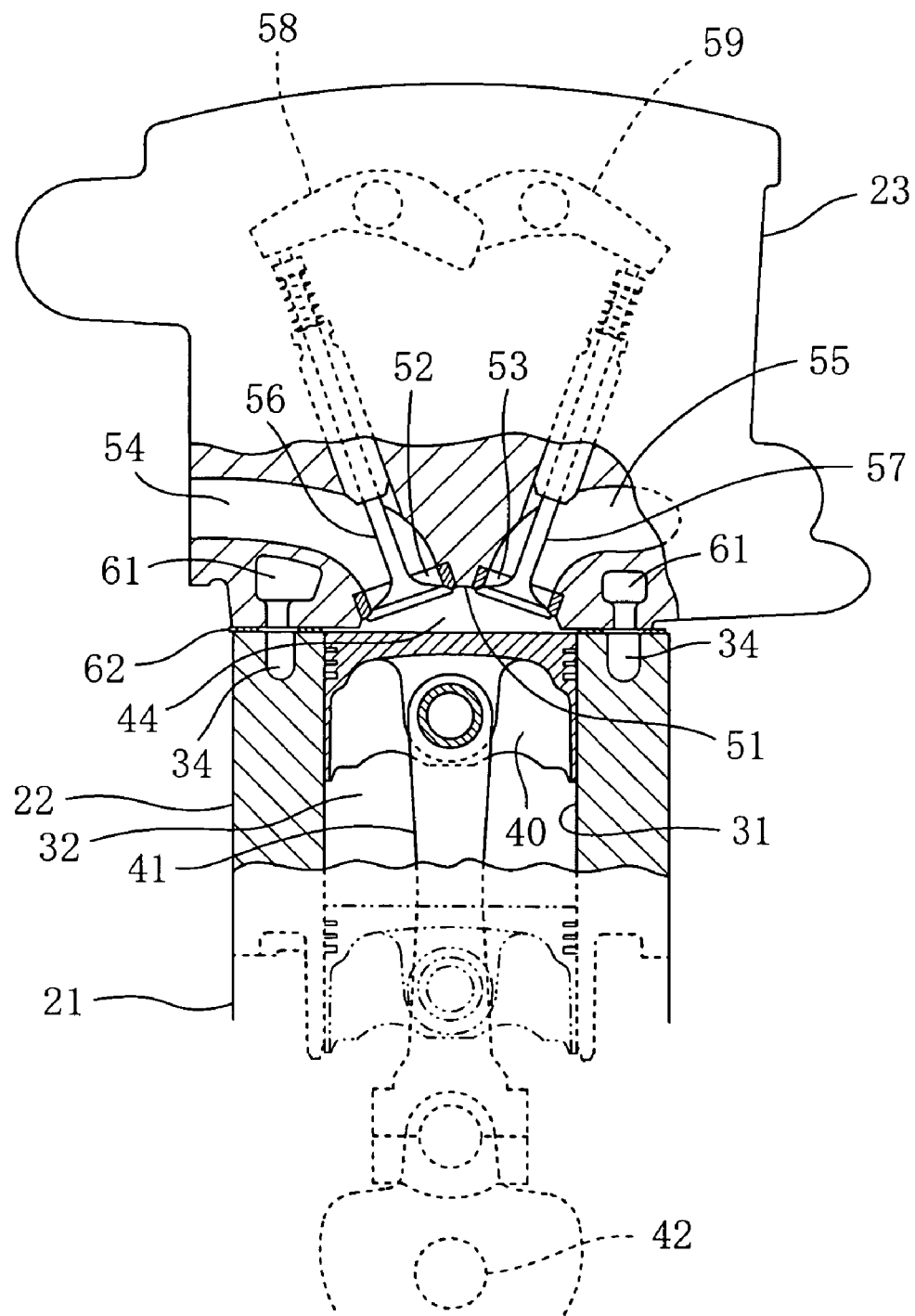
FIG. 3 is a cross sectional view showing an essential part of the engine according to a preferred embodiment of the present invention.
Figure 4:
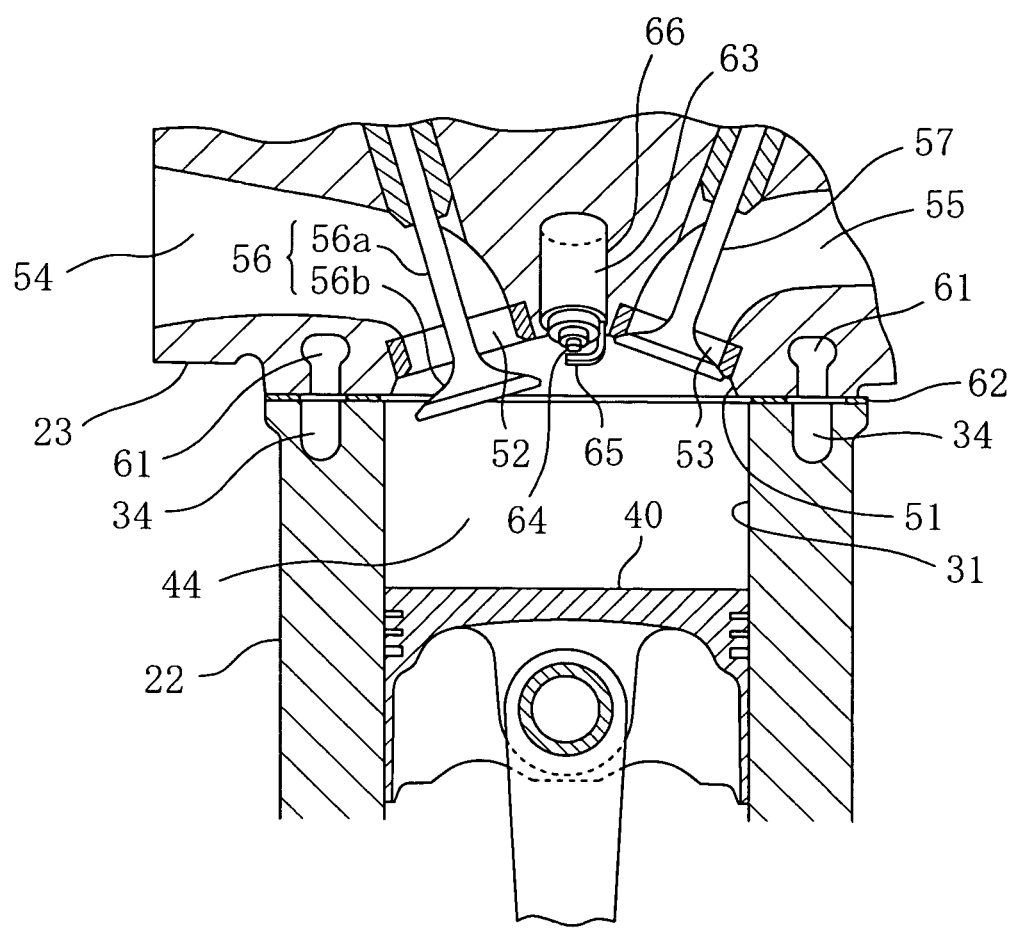
FIG. 4 is a cross sectional view showing an essential part of the engine according to a preferred embodiment of the present invention.

An injector 14 is mounted to the cylinder head 23. The injector 14 is provided downstream of the throttle valve 13 in the intake passage 11 and arranged in the vicinity of an intake opening 52. The injector 14 is arranged to inject a fuel toward the intake opening 52 and between the throttle valve 13 and the intake opening 52. In FIGS. 3 and 4, depiction of the injector 14 is omitted.

The exhaust passage 12 includes an exhaust port 55 formed in the cylinder head 23, an exhaust pipe 17 connected to the cylinder head 23, a catalyst casing 18 provided on the exhaust pipe 17, and a muffler 19 provided on a tip end of the exhaust pipe 17. A ternary catalyst 7 is accommodated in the catalyst casing 18. Sudden enlarged portions and contracted portions in the flow passage area do not exist in the exhaust pipe 17 upstream of the catalyst casing 18, that is, a portion (guide pipe) extending from an outlet of the exhaust port 55 to an inlet of the catalyst casing 18. Therefore, the exhaust pipe 17 is substantially constant in flow passage area.

As shown in FIG. 3, a column shaped cylinder chamber 32 is defined by a cylinder inner surface 31 of the cylinder 22 and a piston 40 accommodated in the cylinder chamber 32. The piston 40 is connected to a connecting rod 41 which is connected to the crankshaft 42. A water jacket 34 is formed on an upper surface of the cylinder 22. The water jacket 34 is arranged to surround a periphery of the cylinder chamber 32 as viewed from a longitudinal direction (a vertical direction in FIG. 3) of the cylinder 22.

A pent roof type recess 51 is preferably formed on a lower surface of the cylinder head 23 to cover an upper portion of the cylinder chamber 32. However, the recess 51 is not limited in shape but may be, for example, hemi-spherical, multi-spherical, or other suitable shape. A combustion chamber 44 is defined by the recess 51, the cylinder inner surface 31, and an upper surface of the piston 40. The recess 51 is preferably formed with two intake openings 52 and two exhaust openings 53, for example. Only one intake opening 52 and exhaust opening 53 is shown in FIG. 3.

The cylinder head 23 is formed with the intake port 54 in communication with the combustion chamber 44 through the intake openings 52 and the exhaust port 55 in communication with the combustion chamber 44 through the exhaust openings 53. As shown in FIG. 2, the intake port 54 is in communication with the intake passage in the throttle body 16. The exhaust port 55 is in communication with the exhaust passage in the exhaust pipe 17.

As shown in FIG. 3, the cylinder head 23 is provided with intake valves 56 that open and close the intake openings 52 and exhaust valves 57 that open and close the exhaust openings 53. As shown in FIG. 4, the intake valves 56 include a shank 56a and an umbrella portion 56b formed at a tip end of the shank 56a. The exhaust valves 57 preferably have the same structure as that of the intake valves 56. The intake valves 56 and the exhaust valves 57 are biased in directions in which the intake openings 52 and the exhaust openings 53 are closed, respectively. As shown in FIG. 3, rocker arms 58, 59 are provided in the cylinder head 23 and periodically open and close the intake valves 56 and the exhaust valves 57, respectively. However, a valve operating mechanism that opens and closes the intake valves 56 and the exhaust valves 57 is in no way limiting.

A water jacket 61 is provided on the lower surface of the cylinder head 23. The water jacket 61 is arranged in a position corresponding to the water jacket 34 of the cylinder 22. A gasket 62 is interposed between the cylinder head 23 and the cylinder 22. The gasket 62 is formed with a plurality of holes (not shown) that provide for communication between the water jacket 61 of the cylinder head 23 and the water jacket 34 of the cylinder 22.

As shown in FIG. 4, the cylinder head 23 is provided with an ignition plug 63. The ignition plug 63 includes a plug body 66, a central electrode 64 provided at a tip end of the plug body 66, and a lateral electrode 65. The central electrode 64 and the lateral electrode 65 project toward the combustion chamber 44 from the recess 51 of the cylinder head 23.

Figure 5:
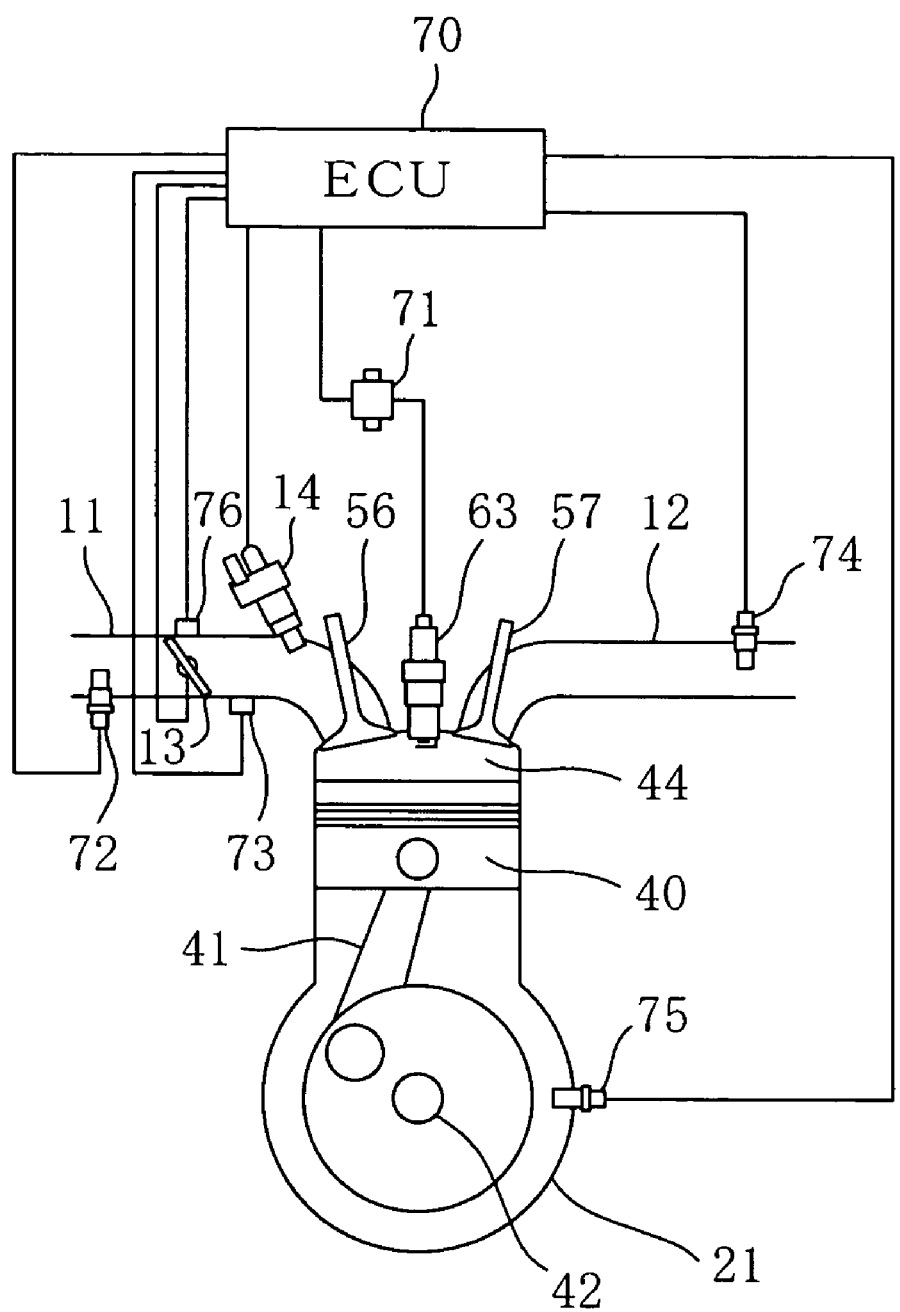
FIG. 5 is a view showing the construction of a device that controls the engine according to a preferred embodiment of the present invention.

As shown in FIG. 5, a temperature sensor 72 that detects temperature in the intake passage 11, a pressure sensor 73 that detects pressure in the intake passage 11, and a throttle position sensor 76 that detects an opening degree of the throttle valve 13, are all preferably provided in the intake passage 11 of the engine 5. The pressure sensor 73 is provided downstream of the throttle valve 13. An $O_2$ sensor 74 is provided in the exhaust passage 12. A crank angle sensor 75 that detects a crank angle is provided in the crankcase 21. The sensors 72 to 76 are connected to an engine control unit (ECU) 70. The ECU 70 is connected to the ignition plug 63 through an ignition coil 71 to control the ignition timing of the ignition plug 63. The ECU 70 is also connected to the injector 14 to control the fuel injection timing of the injector 14.

At the time of steady running, idling operation, or the like, the ECU 70 controls the throttle valve 13 or the injector 14 so that an air-fuel ratio becomes substantially 14.7 (theoretical air fuel ratio). For example, the ECU 70 controls an intake quantity or a fuel injection quantity to thereby control an air-fuel ratio to be about 14.2 to about 15.2 at the time of idling operation. In this manner, by making an air-fuel ratio substantially equal to a theoretical air fuel ratio, it is possible to effectively purify CO, HC and NOx contained in exhaust gases by means of the ternary catalyst 7 in the exhaust passage 12, thus enabling effective operation of the ternary catalyst 7.

At the time decelerated operation is effected with the throttle valve 13 opened, the ECU 70 selectively executes a cycle (referred below to as injection cycle) in which a fuel is injected from the injector 14, and a cycle (referred below to as non-injection cycle) in which fuel injection is inhibited. The cycles of the 4-cycle engine 5 are composed of an intake stroke, a compression stroke, an expansion stroke, and an exhaust stroke.

In the injection cycle, a fuel is injected from the injector 14 in the course of the intake stroke, more specifically, while the intake valves 56 are opened. At this time, the ECU 70 controls a fuel injection quantity of the injector 14 so that an air-fuel ratio becomes substantially a theoretical air fuel ratio. As a result, combustion at the theoretical air fuel ratio is performed in the combustion chamber 44 and exhaust gases after combustion are effectively purified by the ternary catalyst 7 in the exhaust pipe 17. That is, the ternary catalyst 7 effectively purifies CO, HC and NOx contained in exhaust gases. As a result, clean gases are discharged from the exhaust pipe 17.

On the other hand, in the non-injection cycle fuel is not injected from the injector 14 in any one of the intake stroke, compression stroke, expansion stroke, and exhaust stroke. Therefore, only air is sucked into the combustion chamber 44 and the air is discharged from the combustion chamber 44 in the exhaust stroke. The discharged air flows into the exhaust pipe 17 through the exhaust port 55 and is discharged outside after passing through the ternary catalyst 7. Therefore, clean gases are also discharged outside from the exhaust pipe 17 in the non-injection cycle.

Figure 6A:
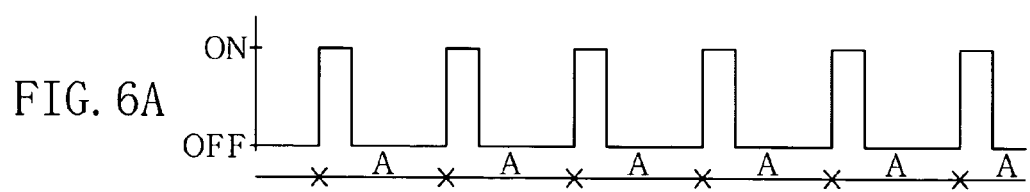
FIGS. 6A, 6B and 6C are timing charts showing the fuel injection timing of an injector.
Figure 6B:
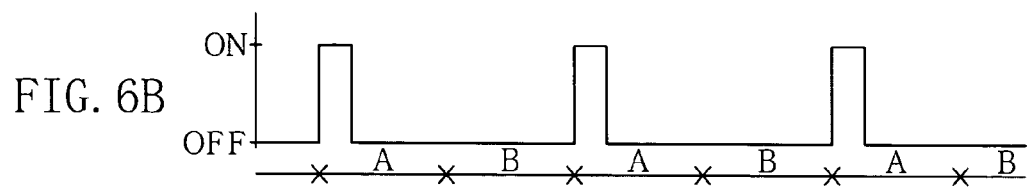
Figure 6C:
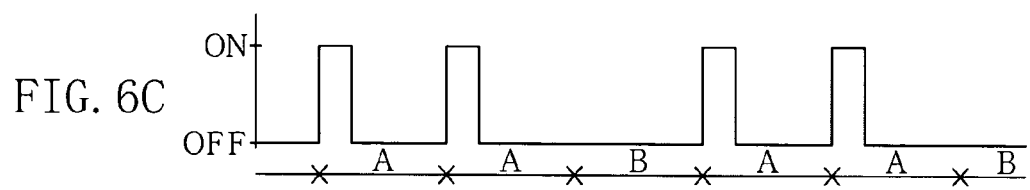

A pattern for selection of the injection cycle and the non-injection cycle is not particularly limited. For example, injection cycles A and non-injection cycles B may be alternately repeated as shown in FIG. 6B. In other words, the non-injection cycle B may be executed once whenever the injection cycle A is executed once. As shown in FIG. 6C, the non-injection cycle B may be executed once whenever the injection cycle A is executed twice. Further, the non-injection cycle B may be executed once whenever the injection cycle A is executed three times or more, for example. The injection cycle A and the non-injection cycle B may be selected on the basis of a regular pattern or an irregular pattern. FIG. 6A shows a fuel injection pattern at the time of steady running. At the time of steady running, the injection cycle A is executed continually so that the injector 14 is made ON every cycle.

Figure 7A:
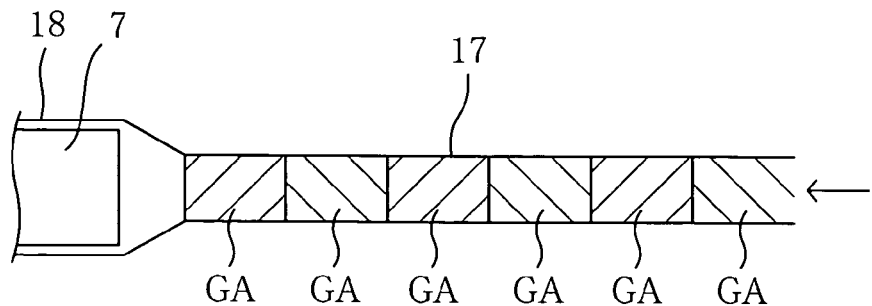
FIGS. 7A, 7B and 7C are conceptual views schematically showing flow of gases in an exhaust passage.
Figure 7B:
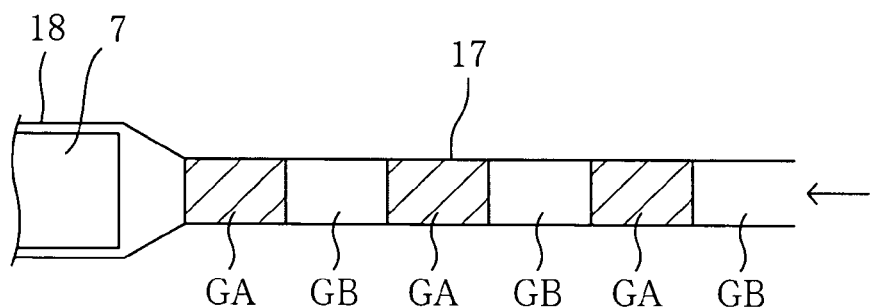
Figure 7C:
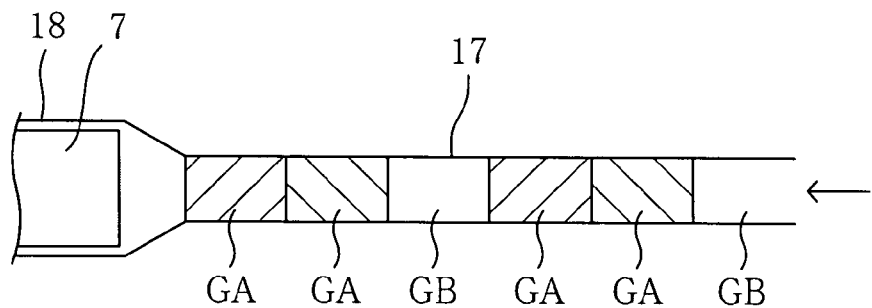

FIGS. 7A to 7C are views conceptually showing modes of gas flow in the exhaust pipe 17, and correspond to injection patterns shown in FIGS. 6A to 6C. As shown in FIG. 7A, exhaust gases GA at the theoretical air fuel ratio continually flow into the ternary catalyst 7 at the time of steady operation. On the other hand, when the injection cycle A and the non-injection cycle B are alternately executed at the time of decelerated operation exhaust gases GA at the theoretical air fuel ratio and air GB alternately flow into the ternary catalyst 7 as shown in FIG. 7B. When the non-injection cycle B is executed once after the injection cycle A is executed twice at the time of decelerated operation, air GB flows into the ternary catalyst 7 after two cycles of exhaust gases GA at the theoretical air fuel ratio flow into the ternary catalyst as shown in FIG. 7C.

As described above, since the engine 5 executes the non-injection cycle B at the time of decelerated operation (see FIG. 6B or 6C), consumption of fuel can be reduced as compared with the case where the non-injection cycle B is not executed (see FIG. 6A). Accordingly, it is possible to improve fuel consumption economy.

In the injection cycle A, the injector 14 or the like is controlled so that an air-fuel ratio becomes substantially a theoretical air fuel ratio. Therefore, it is possible to effectively purify exhaust gases after combustion by means of the ternary catalyst 7. On the other hand, exhaust gases are not generated in the non-injection cycle B. Therefore, purification with the ternary catalyst 7 is dispensed with. Accordingly, clean gases can be discharged from the exhaust pipe 17 in both the injection cycle A and the non-injection cycle B.

With the engine 5, the injector 14 is preferably arranged in the vicinity of the intake opening 52. The injector 14 injects a fuel toward the intake opening 52. Therefore, it is possible to inhibit the fuel from adhering to a wall surface of the intake port 54. Accordingly, it is possible to inhibit the adhered fuel from flowing into the combustion chamber 44 along the wall surface in the injection cycle A to surely perform combustion at the theoretical air fuel ratio. Since the adhered fuel can also be inhibited from flowing into the combustion chamber 44 in the non-injection cycle B, it is possible to prevent unintentional combustion.

With the engine 5, an appropriate combination of the effects described above makes it possible to obtain a synergistic effect not conventionally produced and make a further improvement in fuel consumption economy compatible with purification of exhaust gases by means of a ternary catalyst.

With the engine 5, a region of the exhaust pipe 17 extending from the outlet of the exhaust port 55 to the inlet of the catalyst casing 18 is substantially constant in flow passage area. Since no enlarged portions or contracted portions in the flow passage area exist upstream of the catalyst casing 18, it is possible to suppress mixing of exhaust gases discharged in the injection cycle A and an air discharged in the non-injection cycle B. Accordingly, it is possible to more reliably achieve the effects described above.

Figure 8:
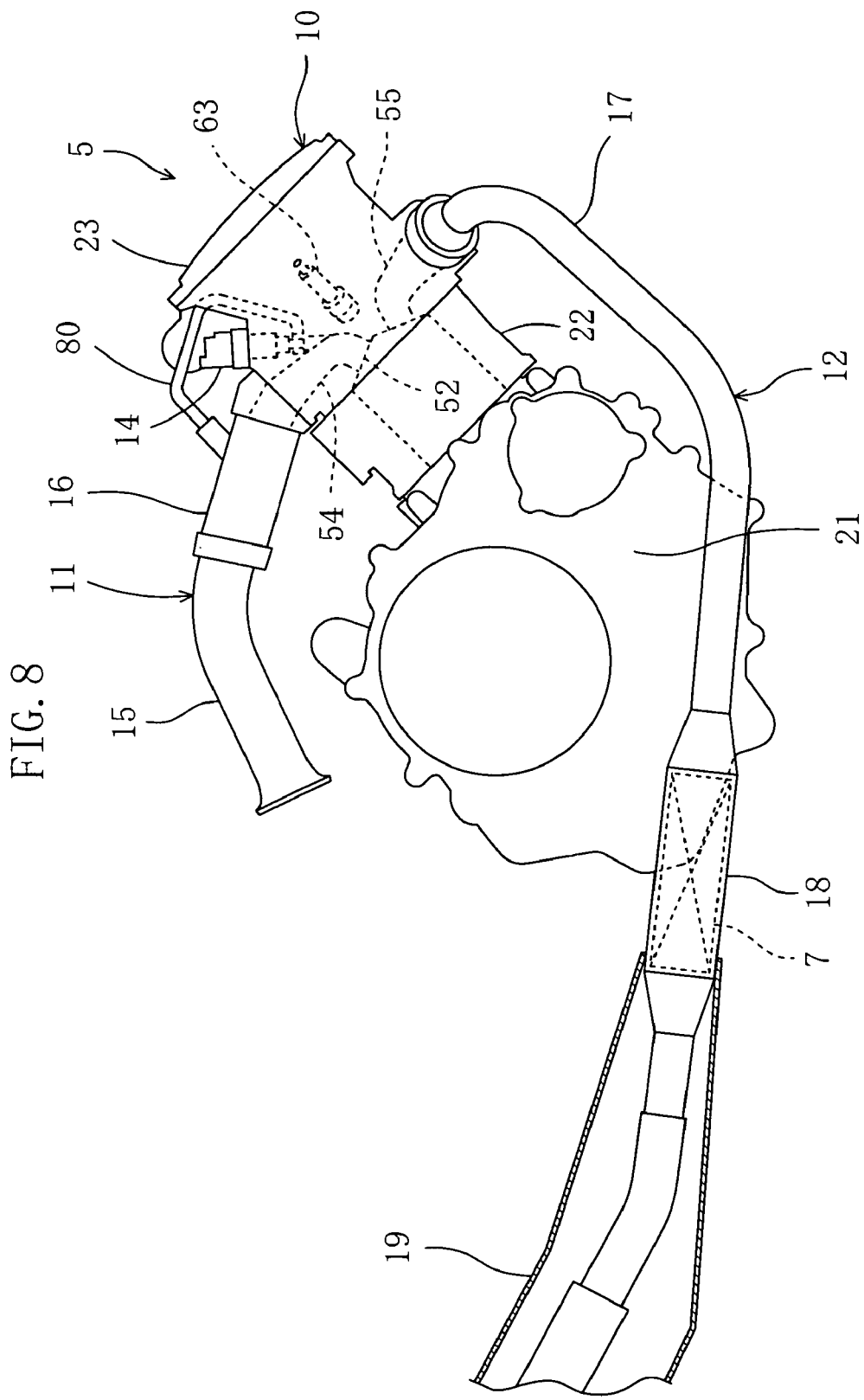
FIG. 8 is a view showing the construction of an engine according to a further preferred embodiment of the present invention.

A further present preferred embodiment will be described with reference to FIGS. 8 to 12. As shown in FIG. 8, an engine 5 according to the present preferred embodiment includes an air supply passage 80 that conducts air to an injection port of injector 14. Identification and description of the elements in FIGS. 8 to 10 in common with those elements previously identified and described with respect to FIGS. 2 to 5 have been omitted for simplicity.

Figure 9:
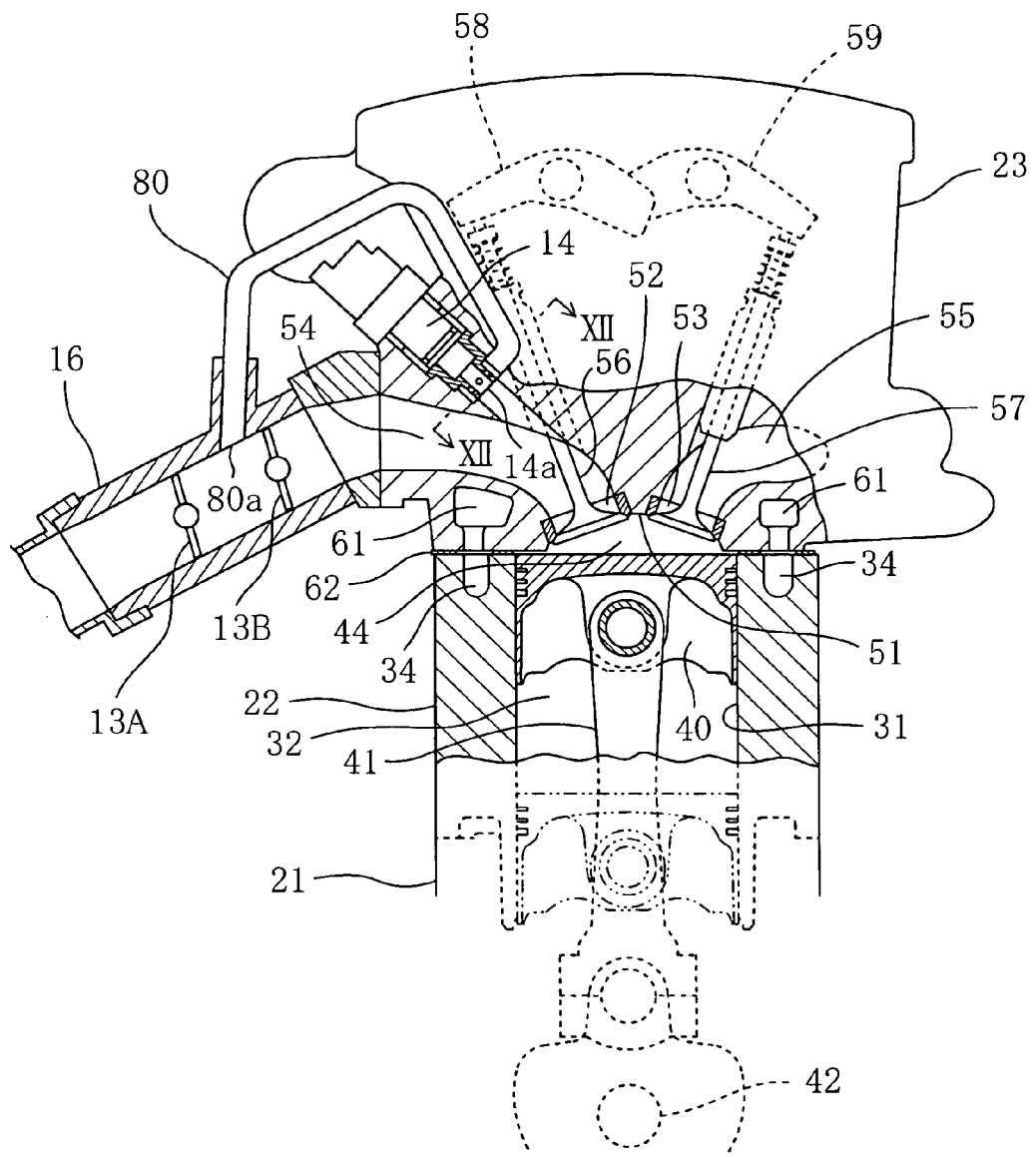
FIG. 9 is a cross sectional view showing an essential part of the engine according to the further preferred embodiment of the present invention.
Figure 10:
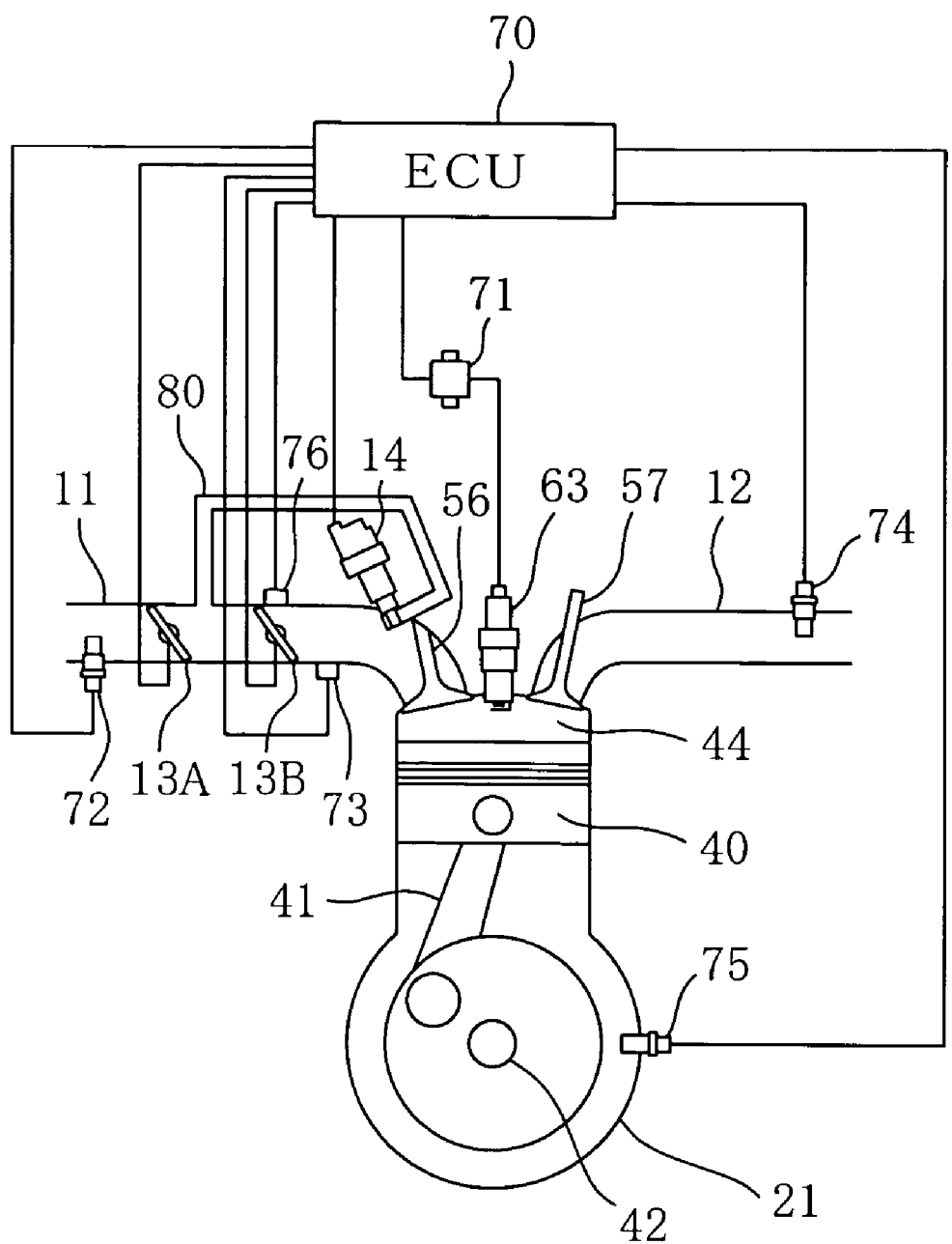
FIG. 10 is a view showing the construction of a device that controls the engine according to the further preferred embodiment of the present invention.

As shown in FIG. 9, a first throttle valve 13A and a second throttle valve 13B, positioned downstream of the first throttle valve 13A, are arranged in a throttle body 16 of the engine 5. As shown in FIG. 10, the first throttle valve 13A and the second throttle valve 13B are connected to and controlled by the ECU 70. Opening and closing of the first throttle valve 13A is controlled over a wide operating range from a predetermined low load region to a predetermined high load region. On the other hand, the second throttle valve 13B is placed in a fully closed state in the low load region and opening and closing thereof is control led in the high load region.

Figure 11:
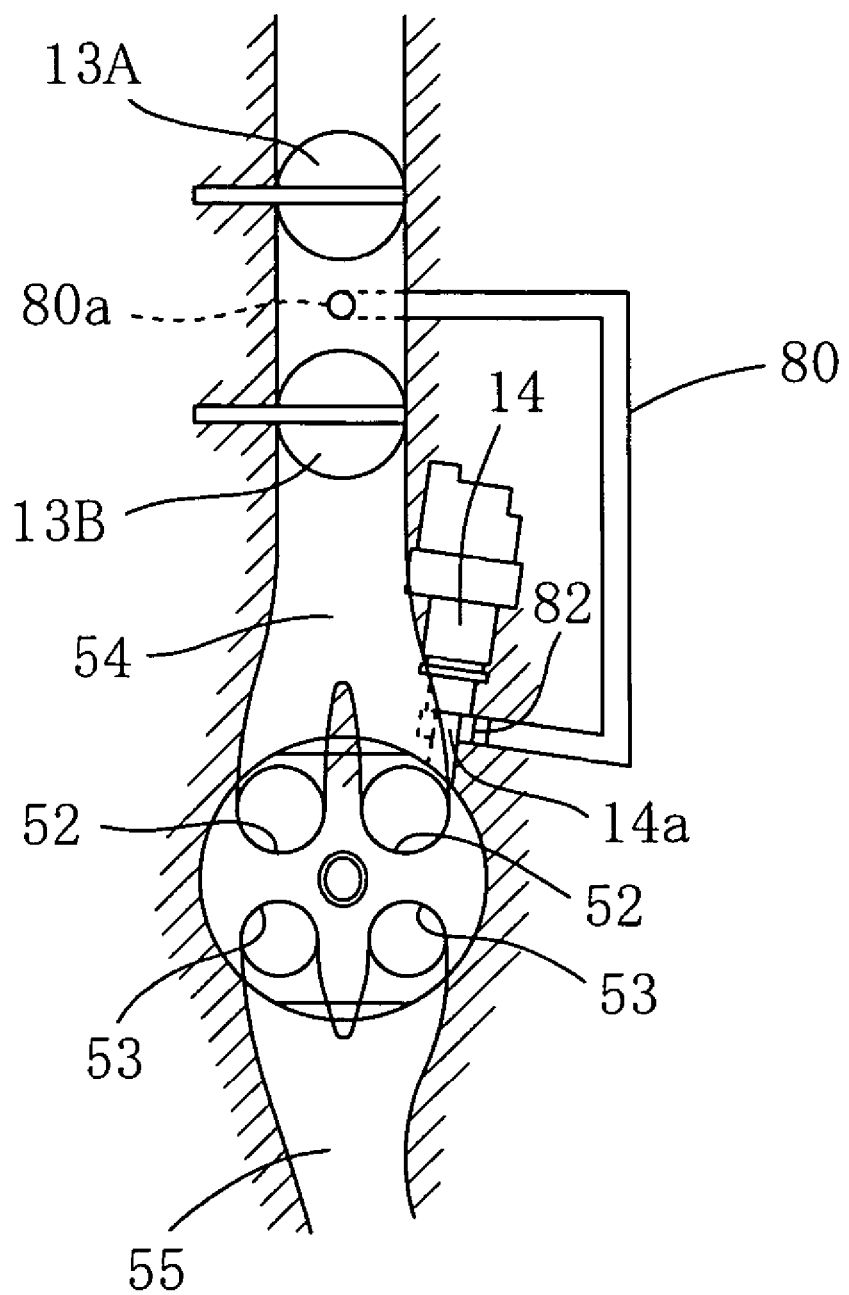
FIG. 11 is a plan view showing the construction of the engine according to the further preferred embodiment of the present invention.

As shown in FIGS. 9 and 11, an upstream-side opening 80a of the air supply passage 80 is located between the first throttle valve 13A and the second throttle valve 13B of the throttle body 16. A downstream end of the air supply passage 80 is arranged in the vicinity of an injection port 14a of an injector 14. Also in the present preferred embodiment, the injector 14 is preferably arranged in the vicinity of the intake opening 52 to inject a fuel toward the intake opening 52.

Figure 12:
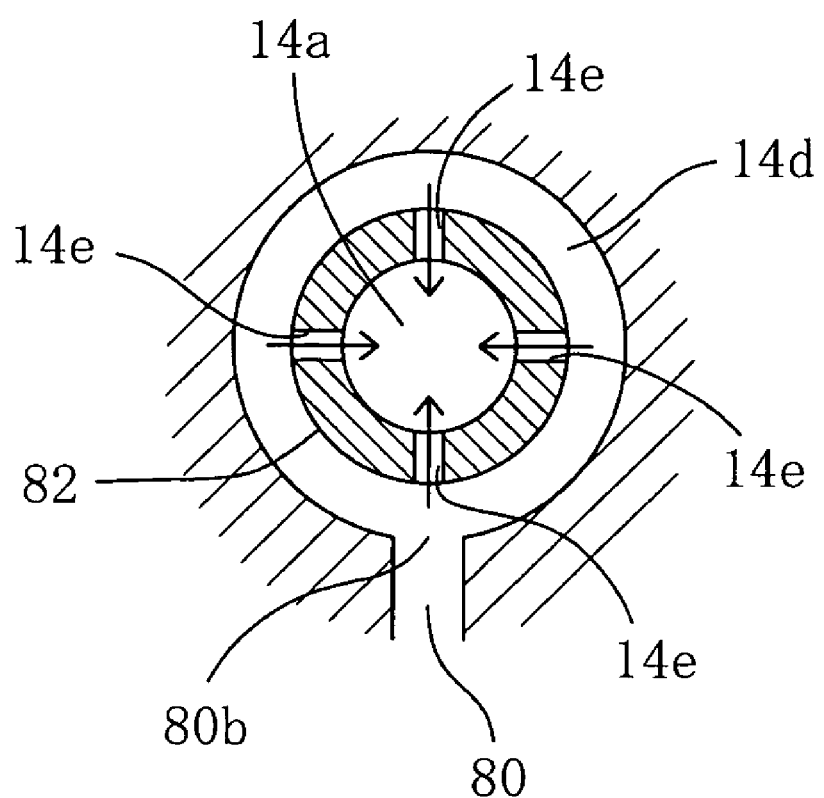
FIG. 12 is a cross sectional view taken along the line XII-XII in FIG. 9.

As shown in FIGS. 11 and 12, a ring-shaped member 82 is provided around the injection port 14a of the injector 14. A ring-shaped communication passage 14d arranged on an outer peripheral side of the ring-shaped member 82 is in communication with the air supply passage 80. A downstream-side opening 80b of the air supply passage 80 faces the ring-shaped communication passage 14d. The ring-shaped member 82 is formed with a plurality of communication passages 14e that provide communication between the ring-shaped communication passage 14d and the injection port 14a. The communication passages 14e are arranged at circumferential intervals of the ring-shaped member 82 and extend radially with respect to the ring-shaped member 82.

With such construction, air in the air supply passage 80 flows once into the ring-shaped communication passage 14*d* and then is supplied to the injection port 14*a* through the communication passages 14*e*. Air supplied to the injection port 14*a* collides against a fuel which is injected in a direction that is perpendicular or substantially perpendicular to the direction in which the air is supplied. As a result, the injected fuel is made into particulates by the air. The direction that the air is supplied need not necessarily be made perpendicular to the direction that the fuel is injected, but it is possible to supply air in a direction inclined to the direction of fuel injection, for example.

In the present preferred embodiment, the ECU 70 selectively executes an injection cycle and a non-injection cycle at the time of a predetermined decelerated operation. At the time of decelerated operation, only the first throttle valve 13A is opened and the second throttle valve 13B is closed. However, the decelerated operation can be also effected in a state in which both the first throttle valve 13A and the second throttle valve 13B are opened.

The effects described above can also be produced in the present preferred embodiment since an injection cycle and a non-injection cycle are selectively executed at the time of decelerated operation. Additionally, the injected fuel can also be made into particulates in the present preferred embodiment since the air supply passage 80 is arranged to conduct air to the injection port 14*a* of the injector 14. Although the injector 14 is arranged in the vicinity of the intake opening 52 and an intake quantity is small at the time of decelerated operation, fuel and air can be favorably mixed with each other in the combustion chamber 44. Accordingly, combustion can be made stable. Also, it is possible to achieve combustion at the theoretical air fuel ratio, thus enabling making effective use of the ternary catalyst 7.

The present invention is not limited to the preferred embodiments described above, but various variations and modifications may be made without departing from the scope of the present invention. The presently disclosed preferred embodiments are therefore considered in all respects to be illustrative and not restrictive. The scope of the present invention is indicated by the appended claims rather than the foregoing description, and all changes which come within the meaning and range of equivalence thereof are intended to be embraced therein.

What is claimed is:

1. A single cylinder engine comprising:
    an engine body including a combustion chamber, an intake opening and an exhaust opening which face toward the combustion chamber, an intake passage in communication with the combustion chamber through the intake opening, and an exhaust passage in communication with the combustion chamber through the exhaust opening;
    an intake valve that opens and closes the intake opening;
    an exhaust valve that opens and closes the exhaust opening;
    an injector that injects a fuel toward the intake opening and into the intake passage;
    a ternary catalyst provided in the exhaust passage;
    a control device that performs a decelerating operation in which the control device executes a cycle for injection of a fuel from the injector, a quantity of which makes an air fuel ratio in the combustion chamber substantially equal to a theoretical air fuel ratio, and a cycle for inhibition of fuel injection from the injector in which the fuel is not injected, such that both of the cycle for injection of a fuel from the injector and the cycle for inhibition of fuel injection from the injector occur at least one time during the decelerating operation; and
    a throttle valve provided in the intake passage; wherein
    the decelerating operation is executed with the throttle valve open.

2. The single cylinder engine according to claim 1, wherein the injector includes an injection port through which a fuel is injected, and the engine body includes an air supply passage through which air is conducted to the injection port.

3. The single cylinder engine according to claim 1, wherein the exhaust passage includes an accommodation casing that accommodates the ternary catalyst, a guide pipe through which gases from the combustion chamber is conducted to the accommodation casing, and the guide pipe is substantially constant in flow passage area.

4. A single cylinder engine comprising:
    an engine body including a combustion chamber, an intake opening and an exhaust opening which face toward the combustion chamber, an intake passage in communication with the combustion chamber through the intake opening, and an exhaust passage in communication with the combustion chamber through the exhaust opening;
    an intake valve that opens and closes the intake opening;
    an exhaust valve that opens and closes the exhaust opening;
    an injector arranged in the vicinity of the intake opening to inject a fuel toward the intake opening and into the intake passage;
    a ternary catalyst provided in the exhaust passage;
    a control device that performs a decelerating operation in which the control device executes a cycle for injection of a fuel from the injector, a quantity of which makes an air fuel ratio in the combustion chamber substantially equal to a theoretical air fuel ratio, and a cycle for inhibition of fuel injection from the injector in which the fuel is not injected, such that both of the cycle for injection of a fuel from the injector and the cycle for inhibition of fuel injection from the injector occur at least one time during the decelerating operation; and
    a throttle valve provided in the intake passage; wherein
    the decelerating operation is executed with the throttle valve open.

5. A single cylinder engine comprising:
    a cylinder block in which a combustion chamber is located;
    a cylinder head including an intake opening and an exhaust opening which face toward the combustion chamber, the cylinder head being joined to the cylinder block;
    an intake port in communication with the combustion chamber through the intake opening, and an exhaust port in communication with the combustion chamber through the exhaust opening;
    an exhaust pipe connected to the cylinder head and in communication with the exhaust opening;
    an intake valve that opens and closes the intake opening;
    an exhaust valve that opens and closes the exhaust opening;
    an injector mounted to the cylinder head to inject a fuel toward the intake opening;
    a ternary catalyst provided in the exhaust pipe;
    a control device that performs a decelerating operation in which the control device executes a cycle for injection of a fuel from the injector, a quantity of which makes an air fuel ratio in the combustion chamber substantially equal to a theoretical air fuel ratio, and a cycle for inhibition of fuel injection from the injector in which the fuel is not injected, such that both of the cycle for injection of a fuel from the injector, and the cycle for inhibition of fuel injection from the injector occur at least one time during the decelerating operation; and
    a throttle valve provided in the intake passage; wherein the decelerating operation is executed with the throttle valve open.

6. A vehicle comprising:

a vehicle body;

a wheel mounted to the vehicle body; and a single cylinder engine that drives the wheel, the single cylinder engine including:

an engine body including a combustion chamber, an intake opening and an exhaust opening which face toward the combustion chamber, an intake passage in communication with the combustion chamber through the intake opening, and an exhaust passage in communication with the combustion chamber through the exhaust opening;

an intake valve that opens and closes the intake opening;

an exhaust valve that opens and closes the exhaust opening;

an injector that injects a fuel toward the intake opening and into the intake passage;

a ternary catalyst provided in the exhaust passage;

a control device that performs a decelerating operation in which the control device executes a cycle for injection of a fuel from the injector, a quantity of which makes an air fuel ratio in the combustion chamber substantially equal to a theoretical air fuel ratio, and a cycle for inhibition of fuel injection from the injector in which the fuel is not injected, such that both of the cycle for injection of a fuel from the injector, and the cycle for inhibition of fuel injection from the injector occur at least one time during the decelerating operation; and a throttle valve provided in the intake passage; wherein the decelerating operation is executed with the throttle valve open.

* * * * *